United States Patent
Liang (10) Patent No.: US 12,309,512 B2
(45) Date of Patent: May 20, 2025

(54) METHOD, DEVICE, ELECTRONIC DEVICE, AND STORAGE MEDIUM FOR GENERATING DEPTH IMAGE

(71) Applicant: Rayprus Technology (Foshan) Co., Ltd., Foshan (CN)

(72) Inventor: Ho-Kai Liang, New Taipei (TW)

(73) Assignee: Rayprus Technology (Foshan) Co., Ltd., Foshan (CN)

( * ) Notice: Subject to any disclaimer, the term of this patent is extended or adjusted under 35 U.S.C. 154(b) by 152 days.

(21) Appl. No.: 18/243,912

(22) Filed: Sep. 8, 2023

(65) Prior Publication Data

US 2025/0039567 A1    Jan. 30, 2025

(30) Foreign Application Priority Data

Jul. 26, 2023   (CN) .......................... 202310929805.3

(51) Int. Cl.
| | |
|---|---|
| *H04N 25/47* | (2023.01) |
| *G06T 7/246* | (2017.01) |
| *G06T 7/579* | (2017.01) |
| *H04N 23/695* | (2023.01) |

(52) U.S. Cl.
CPC ............. *H04N 25/47* (2023.01); *G06T 7/248* (2017.01); *G06T 7/579* (2017.01); *H04N 23/695* (2023.01); *G06T 2207/10028* (2013.01); *G06T 2207/10152* (2013.01); *G06T 2207/30204* (2013.01); *G06T 2207/30241* (2013.01)

(58) Field of Classification Search
CPC ...... H04N 25/47; H04N 23/695; G06T 7/248; G06T 7/579; G06T 2207/10028; G06T 2207/10152; G06T 2207/30204; G06T 2207/30241

See application file for complete search history.

(56) References Cited

U.S. PATENT DOCUMENTS

| | | | |
|---|---|---|---|
| 12,177,572 B2 * | 12/2024 | Cohen-Duwek | ....... B25J 9/1664 |
| 2022/0301189 A1 * | 9/2022 | Yamada | .................. G06T 7/248 |

FOREIGN PATENT DOCUMENTS

| | | |
|---|---|---|
| CN | 103900532 | 7/2014 |
| CN | 109969989 | 7/2019 |
| CN | 111540003 | 8/2020 |
| CN | 114690226 | 7/2022 |
| CN | 114830194 | 7/2022 |
| TW | I807904 | 7/2023 |

* cited by examiner

*Primary Examiner* — Yogesh K Aggarwal
(74) *Attorney, Agent, or Firm* — ScienBiziP, P.C.

(57) ABSTRACT

A method for generating a depth image includes acquiring multiple event images of a target object by an event camera during a motion cycle, each event image is provided with at least one first event point; marking multiple target pixel points in a background image that have same positional information as the first event point to obtain second event point in the background image; determining an event trajectory in the background image based on each second event point; calculating a depth value of each second event point; and determining pixel value of each target pixel points. The solution provided by the disclosure generates a depth image by a single event camera, and the frame rate of the depth image can be adjusted, which improves efficiency of generating a depth image.

15 Claims, 7 Drawing Sheets

METHOD, DEVICE, ELECTRONIC DEVICE, AND STORAGE MEDIUM FOR GENERATING DEPTH IMAGE

FIELD

The subject matter relates to image processing technologies, and more particularly, to a method, a device, an electronic device, and storage medium for generating depth image.

BACKGROUND

A depth image is a digital image that reflects the positional information of any pixel point within a depth space of the imaging range. Currently, methods for generating depth images primarily utilize structured light technology, time of flight (TOF) technology, or binocular vision technology. Structured light technology involves capturing two-dimensional images with a camera and analyzing the distribution of structured light across the entire image to obtain depth values for each pixel point, which methods require significant computational resources. TOF technology generates depth images by analyzing the time or phase difference between the emission of laser light and its reception by the camera, which methods require hardware of high cost and substantial computational resources. Binocular vision technology calculates the depth value of pixel points by comparing the two-dimensional images of the same target object from different perspectives to generate a depth image, which methods require hardware of high costs and computational resources. Additionally, the binocular vision technology requires synchronized processing of image information captured by multiple cameras, resulting in lower efficiency in generating depth image.

Therefore, there is still room for improvement within the art.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the disclosure.

It should be understood that, the terms "first" and "second" are used to distinguish between elements and are not used to denote a particular order or imply a number of technical features, therefore, unless specifically defined otherwise, features described with "first" and "second" may expressly or implicitly include one or more of the stated features. In the description of the present application, "plurality" means two or more, unless otherwise expressly and specifically defined.

In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described.

The term "comprising," when utilized, means "including, but not necessarily limited to"; it specifically indicates open-ended inclusion or membership in the so-described combination, group, series, and the like.

The hereinafter-described embodiments of the disclosure are presented herein by way of exemplification and not limitation, with reference to the figures.

A method for generating depth image provided by an embodiment can be performed on one or more electronic devices 1. The electronic device 1 is a device capable of automatically performing perform numerical calculation and/or information processing according to pre-set or stored instructions, and its hardware includes, but is not limited to, a microprocessor, an application specific integrated circuit (ASIC), a field-programmable gate array (FPGA), a digital signal processor (DSP), an embedded equipment, and so on.

The electronic device 1 can be any electronic product that can interact with a user. For example, the electronic device 1 can be a personal computer, a tablet computer, a smart phone, a personal digital assistant (PDA), a game console, and an internet protocol television (IPTV), a smart wearable device, etc.

The electronic device 1 may also include network equipment and/or user equipment. Wherein, the network device includes, but is not limited to, a network server, a server group formed by a plurality of network servers, or a cloud formed by many hosts or network servers based on cloud computing.

The network where the electronic device 1 is located includes, but is not limited to, the Internet, a wide area network, a metropolitan area network, a local area network, a virtual private network (VPN), and the like.

Figure 1:
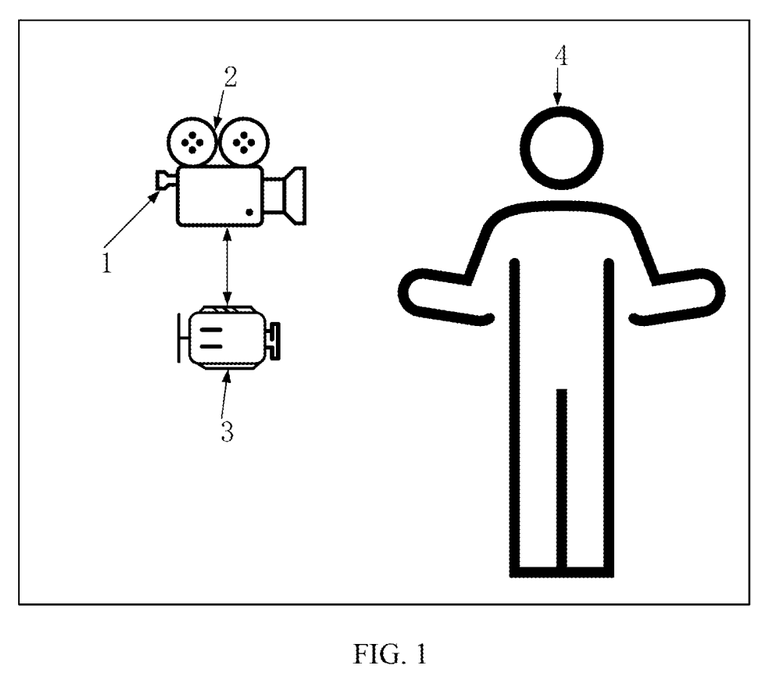
FIG. 1 is an application environment diagram of a device for generating depth image according to an embodiment of the disclosure.

The method for generating depth image provided by the embodiment can be applied to an application environment shown in FIG. 1. In this case, the electronic device 1 may be a chip or microcontroller with data processing and image acquisition capabilities within an event camera 2. It can also be an external device that communicates with the event camera 2. An actuator 3 is connected to the event camera 2 and is used to drive the event camera 2 to move along a predetermined direction based on a preset motion cycle and a preset motion magnitude. The actuator 3 may be selected from a voice coil motor, a stepper motor, a shape memory alloy, and an ultrasonic motor. The preset motion cycle and motion magnitude can be predetermined based on the type of actuator 3. The predetermined direction includes but is not limited to horizontal, vertical, or diagonal directions, which is not limited in this application. The actuator 3 drives the event camera 2 to make periodic movements, capturing images of target object 4 within the imaging range. The electronic device 1 monitors changes in light intensity within the imaging range of the event camera 2 in real-time during its periodic movements to capture event images.

Figure 2:
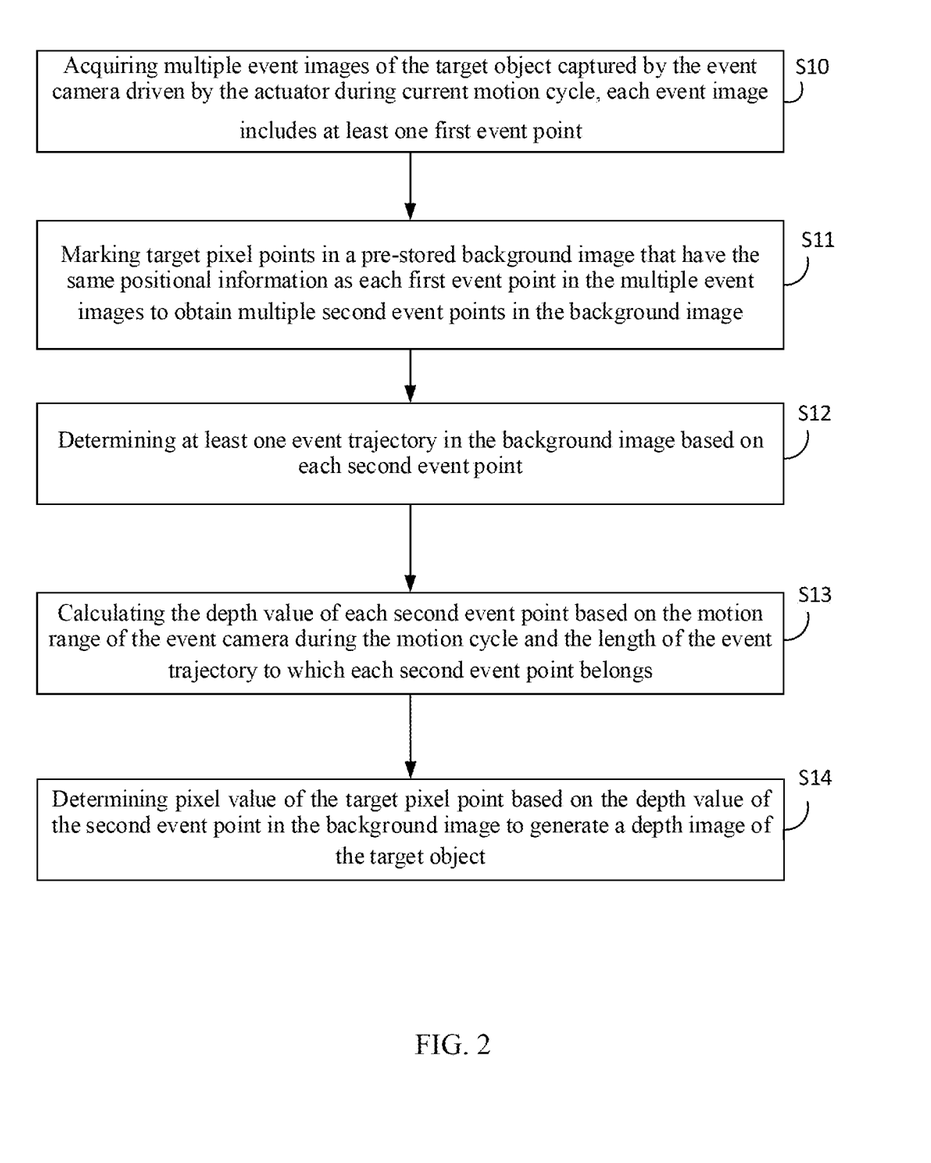
FIG. 2 is a flowchart of an embodiment of a method for generating depth image of the disclosure.
Figure 3:
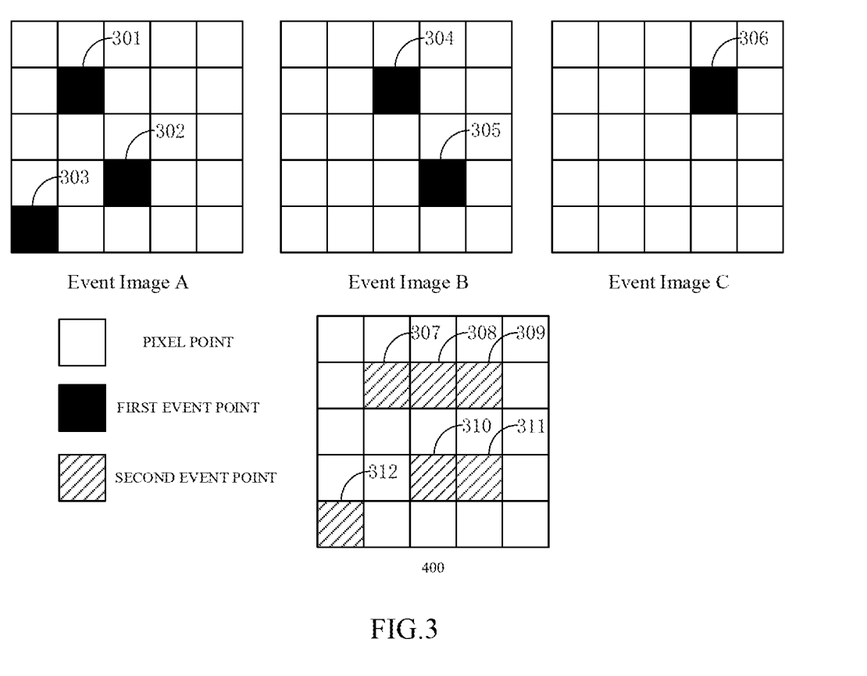
FIG. 3 is a schematic diagram of an embodiment of marking a second event point of the disclosure.

Referring to FIG. 2, a flowchart of an embodiment of the method for generating depth image is provided. The method is provided by way of example, as there are a variety of ways to carry out the method. Each block shown in FIG. 3 represents one or more processes, methods, or subroutines carried out in the example method. Furthermore, the illustrated order of blocks is by example only and the order of the blocks can be changed. Additional blocks may be added, or fewer blocks may be utilized, without departing from this disclosure. According to different requirements, a sequence of each block in this flowchart can be adjusted according to actual requirements, and some blocks can be omitted.

The example method can begin at block S10.

At block S10, acquiring multiple event images of the target object captured by the event camera driven by the actuator during current motion cycle, each event image includes at least one first event point.

Traditional cameras capture output results of all pixel points within the imaging range at a fixed frame rate. In contrast, an event camera continuously monitors the brightness changes of all pixel points within the imaging range in real-time, with each pixel point being independent from one another. The event camera operates with a high scanning frequency (e.g., one million hertz) to monitor the brightness changes of each individual pixel point within the imaging range. When any pixel point within the imaging range experiences a change in brightness, the event camera captures the image information within the imaging range and generates an event image. The pixel point that undergoes brightness changes is determined as a first event point in the event image. The event image has the same dimension as the imaging range, for example, if the imaging range has a dimension of 600*600 pixel points, then the event image also has a dimension of 600*600 pixel points. The event camera offers advantages of fast responsiveness, wide dynamic range, and motion blur-free image capture.

According to some embodiments, the actuator drives the event camera to move along the predetermined direction based on the preset motion period and the preset motion range. Within each motion period, multiple event images containing the first event point can be captured, providing data support for generating depth images of target objects.

According to some embodiments, determining the first event point in the event image includes: monitoring the brightness increase of each pixel point within the imaging range of the event camera in real-time during the preset motion period; when the brightness increase of any pixel point exceeds a preset first threshold, capturing the image information within the imaging range, acquiring the event image, and determining that pixel point as the first event point.

According to some embodiments, determining the first event point in the event image includes: monitoring the brightness decrease of each pixel point within the imaging range of the event camera in real-time during the preset motion period; when the brightness decrease of any pixel point exceeds a preset second threshold, capturing the image information within the imaging range, acquiring the event image, and determining that pixel point as the first event point.

In this embodiment, the imaging range refers to the image area captured by the event camera, typically a rectangular region containing multiple pixel points. When the event camera is driven by the actuator to perform periodic motion, the relative position between the event camera and the target objects exceeds the imaging range constantly changes. Therefore, the received light intensity reflected from the target objects continuously varies. The regions with significant light intensity changes often represent areas where the distance between the target objects and the event camera changes dramatically.

According to some embodiments, all pixel points within the regions of significant light intensity changes, i.e., pixel points with a brightness increase exceeding the preset first threshold or a brightness decrease exceeding the preset second threshold, can be marked as the first event points.

The first threshold and the second threshold can be the same or different. In this embodiment, values of the first and second thresholds are both set to 5.

The first event point can be represented as (x, y, t), where x and y indicate the position information of the first event point in the event image, and t represents the timestamp of the first event point, i.e., the moment when the event image containing the first event point is captured.

Therefore, by the motion of the event camera, at least one event point is generated within the imaging range. Additionally, relying on the independent and high scan frequency characteristics of individual pixel points in the event camera, only event points with brightness changes are captured at the same time. This avoids the involvement of stagnant pixel points with unchanged brightness in the subsequent generation of depth images, reducing computational complexity.

At block S11, marking target pixel points in a pre-stored background image that have the same positional information as each first event point in the multiple event images to obtain multiple second event points in the background image.

According to some embodiments, the background image is an image that includes all the pixel points in the imaging range, and pixel value of all the pixel points in the background image is null value. For any first event point, mark the target pixel points in the background image that have the same positional information based on the position information of the first event point. For example, if the position of a certain first event point in the event image is (3, 4), then the pixel point at the third row and fourth column in the background image is the second event point corresponding to that first event point. The method of marking can be to increment pixel value of the target pixel points by 1 or set the pixel value of the target pixel points to a predetermined value, which is not limited in this application.

Referring to FIG. 3, a schematic diagram of marking a second event point of is shown. Suppose three event images, labeled as Event Image A, Event Image B, and Event Image C, are captured within the motion cycle. Event Image A contains a first event point 301, a second event point 302, and a third event point 303; Event Image B contains a first event point 304 and a first event point 305; and Event Image C contains a first event point 306. After marking the target pixel points in the background image with the same positional information as the first event points, the second event points 307-312 can be obtained. In this case, the first event point 301 corresponds to the second event point 307, and so on for the other first event points and second event points.

Therefore, brightness variation information in the imaging range of the event camera throughout the motion cycle can be integrated by mapping all the first event points from different event images onto the same background image based on their positional relationships, thereby improving the efficiency of generating depth images.

At block S12, determining at least one event trajectory in the background image based on each second event point.

According to some embodiments, the event trajectory can be determined based on the second event points in the background image to represent the offset of the target object within the imaging range as the relative position between the target object and the event camera changes, then offset of the target object within the imaging range of the event camera can be determined based on multiple second event points in the background image.

According to some embodiments, due to the high scanning frequency of the event camera, the first event points with adjacent timestamps may be mapped onto the background image, determining second event points that adjacent to each other. The event trajectory is any isolated second event point or a set of adjacent second event points. The event trajectory represents a path of the offset within the imaging range when there are significant variations in the intensity of the illumination in regions where the event camera undergoes predetermined motion, i.e., the trajectory of the target object's offset within the imaging range.

Figure 4:
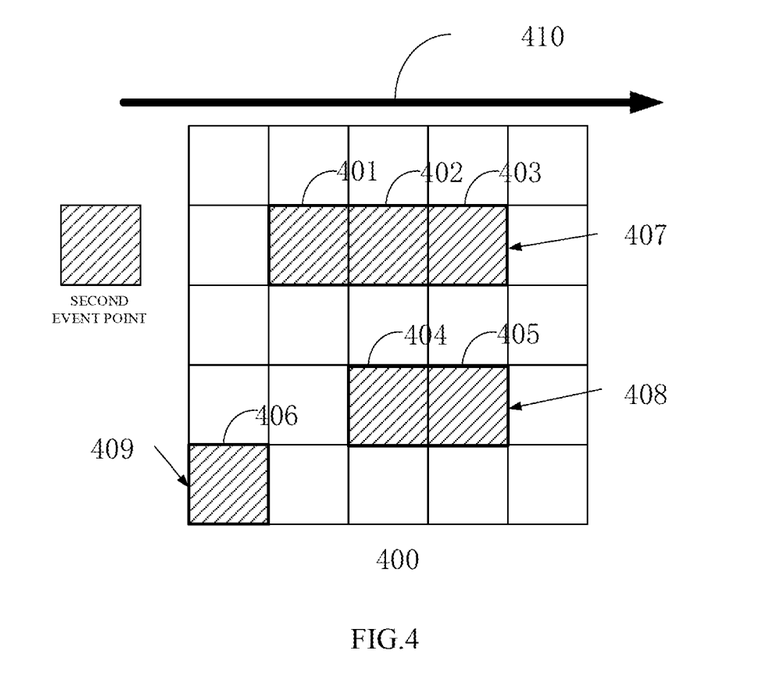
FIG. 4 is a schematic structural diagram of an embodiment of determining an event trajectory in a background image of the disclosure.

Referring to FIG. 4, in the background image 400, since the second event points 401, 402, and 403 are adjacent second event points, an event trajectory 407 can be determined based on these three adjacent second event points. Similarly, the second event points 404 and 405 being adjacent to each other can determine an event trajectory 408. The second event point 406 is isolated from other second event points in the background image 400, so it alone determines an event trajectory 409.

According to some embodiments, number of the pixel points in each event trajectory in the predetermined motion direction is counted as the length of that event trajectory. This length reflects the offset of the target object within the imaging range when the event camera moves with the predetermined motion range in the predetermined motion direction.

Referring to FIG. 4, when the predetermined motion direction 410 is the row direction in the background image 400, the length of the event trajectory 407 is three, the length of the event trajectory 408 is two, and the length of the event trajectory 409 is one.

It should be noted that under the assumption of a fixed distance of motion for the event camera, the offset within the imaging range differs for the second event points corresponding to target objects that are farther away from the event camera compared to those that are closer. Therefore, the offset within the imaging range of the second event points reflects the distance between the target object and the event camera.

Therefore, by determining at least one event trajectory based on the adjacent second event points and the isolated second event point in the background image, an offset trajectory of the target object within the imaging range is represented. Then the length of the event trajectories in the predetermined motion direction is calculated to represent the offset of the target object within the imaging range, providing data basis for subsequent computation of the depth values of each second event point.

At block S13, calculating the depth value of each second event point based on the motion range of the event camera during the motion cycle and the length of the event trajectory to which each second event point belongs.

According to some embodiments, the event trajectory in the background image is composed of multiple second event points, and each second event point corresponds to an area where the intensity of the reflected light from the target object within the imaging range of the event camera undergoes significant changes. Therefore, the length of the event trajectory can reflect the distance between a first plane where the target object is located and a second plane where the event camera is located. The depth value of all second event points in the event trajectory can be calculated based on the length of the event trajectory in the preset direction. The depth value is used to represent the distance between the event camera and the target object.

The motion of the event camera includes translational motion and/or rotational motion. When the event camera performs translational motion, the longer the distance between the target object and the event camera, the longer the length of the event trajectory. When the event camera performs rotational motion, the longer the distance between the target object and the event camera, the shorter the length of the event trajectory.

According to some embodiments, when the event camera performs rotational motion, the motion range is the maximum rotation angle of the event camera during the motion cycle.

According to some embodiments, when the event camera performs translational motion, the motion range is the maximum translation distance of the event camera during the motion cycle. For example, if the event camera continuously translates three meters in the horizontal direction during a motion cycle, the motion range of the event camera in that motion cycle is three meters.

According to some embodiments, when the motion is translational motion, the calculation of the depth value of the second event point based on the motion range of the event camera during the motion cycle and the length of the event trajectory to which the second event point belongs includes: obtaining the field of view (FOV) angle of the event camera along the predetermined motion direction and the total number of pixel points occupied by the axis projection in the background image when the axis is projected onto the background image in the predetermined motion direction; establishing a depth mapping relationship between a length of the event trajectory to which one of the multiple second event points belongs and the depth value of the one second event point based on the FOV angle, the total number of pixel points, and the motion range, the depth mapping relationship satisfies the following formula:

$$h = \frac{fM}{2L \times \tan\frac{\theta}{2}}$$

where L is the length of the event trajectory to which the second event point belongs, θ is the FOV angle, f is the motion range, M is the total number of pixel points, and h is the depth value of the second event point.

According to some embodiments, the FOV angle is the angle range in which the event camera can receive images, which determines the imaging range of the event camera. The larger the FOV angle, the larger the imaging range of the event camera. Since the imaging range of the event camera is a rectangular area, two endpoints of the imaging range are obtained in the predetermined motion direction, and the angle formed by connecting the two endpoints with the lens of the event camera along the predetermined motion direction is the FOV angle of the event camera. Connecting the two endpoints directly yields the projection of the predetermined motion direction's axis on the background image. The number of pixel points that the axis passes through in the background image is the total number of pixel points in the predetermined motion direction of the background image.

Figure 5:
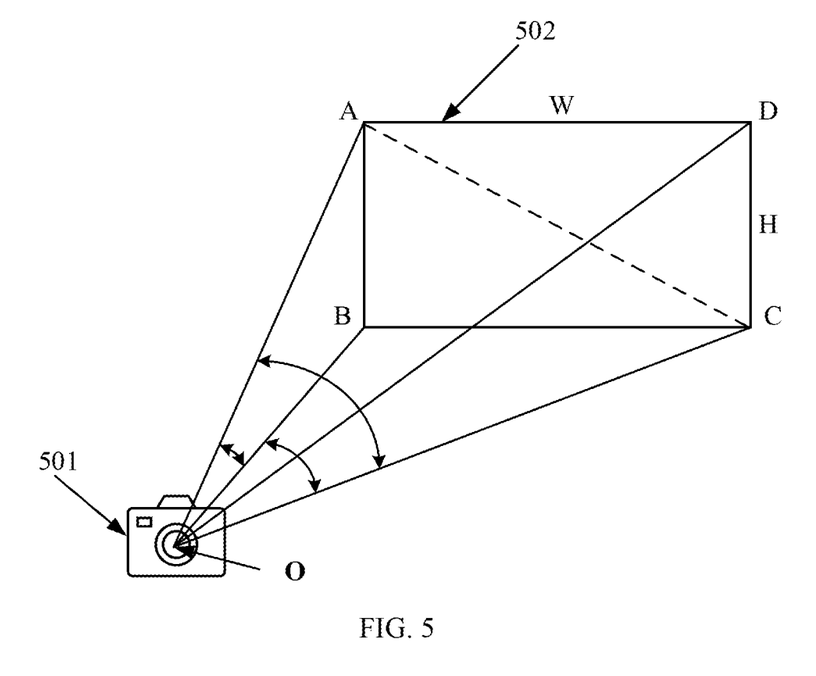
FIG. 5 is a schematic diagram illustrating an imaging principle of an event camera of the disclosure.

Referring to FIG. 5, assuming that the imaging range of the event camera 501 is a rectangular area 502 with width W and height H, i.e., each row in the event image and the background image consists of W pixel points, each column contains H pixel points. When the predetermined motion direction is horizontal, obtain two endpoints B and C on the imaging range 502 in the horizontal direction, connect endpoint B and endpoint C to the lens O respectively, and the FOV angle BOC of the event camera 501 along the horizontal direction is obtained; connecting the endpoint B and the endpoint C directly gives the projection of the axis line of the horizontal motion direction in the background image, and the total number of pixel points traversed by this axis line in the imaging range 502 is. When the predetermined motion direction is vertical, obtain the two endpoints A and B on the imaging range 502 in the vertical direction, connect the endpoint A and the endpoint B to the lens O respectively, and the FOV angle AOB of the event camera 501 along the vertical direction can be obtained; connecting endpoint A and endpoint B directly gives the projection of the axis line of the vertical motion direction in the background image, and the total number of pixel points traversed by this axis line in the imaging range 502 is H. When the predetermined motion direction is diagonal, obtain the two endpoints A and C on the imaging range 502 in the diagonal direction, connect the endpoint A and the endpoint C to the lens O respectively, and the FOV angle AOC of the event camera 501 along the diagonal direction can be obtained. Connecting the endpoint A and endpoint C directly gives the projection of the axis line of the diagonal motion direction in the background image, and the total number of pixel points traversed by this axis line in the imaging range 502 equals to $\sqrt{W^2+H^2}$.

Figure 6:
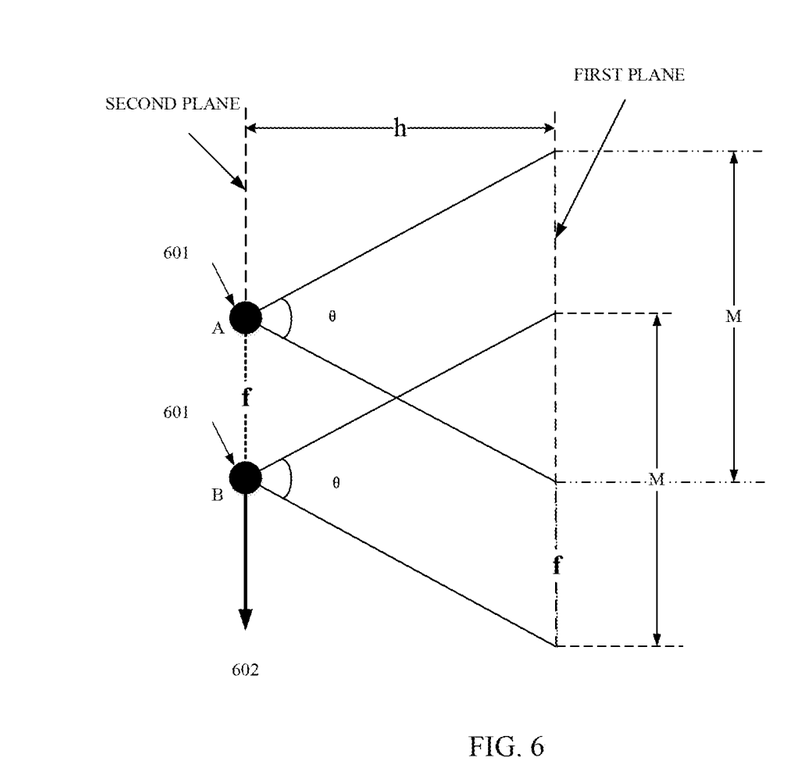
FIG. 6 is a schematic diagram illustrating a translational motion of the event camera of the disclosure.

According to some embodiments, referring to FIG. 6, according to the camera imaging principle, when the event camera 601 moves from position A to position B in a translational motion along the predetermined motion direction 602, the closer the target object to the event camera 601, the greater the offset of the target object in the imaging range, that is, the longer the event trajectory composed of the second event points corresponding to the target object. The ratio between the motion amplitude f of the event camera and the length of the imaging range along the predetermined motion direction is defined as a first ratio, and the ratio between the length L of the event trajectory and the total number M of pixel points in the background image along the motion direction is defined as a second ratio, the first ratio is equal to the second ratio.

The FOV angle along the motion direction is defined as θ, the total number of pixel points in the imaging range along the motion direction is defined as M, the distance between the first plane and the second plane is defined as h, the length of the event trajectory is defined as L, and the motion amplitude of the event camera is defined as f. The relationship between the first ratio and the second ratio satisfies following equation:

$$\frac{L}{M} = \frac{f}{2h \times \tan\frac{\theta}{2}}$$

Where L represents the length of the event trajectory along the motion direction; M represents the total number of pixel points in the background image along the motion direction; f represents the motion amplitude of the event camera within one motion cycle;

$$2h \times \tan\frac{\theta}{2}$$

represents the distance along the motion direction of the first plane in the imaging range of the event camera. For example, when the first plane is 10 meters away from the second plane, and the FOV angle is 60 degrees, the distance along the motion direction of the first plane is 11.5 meters.

Therefore, a depth mapping relationship between the length of the event trajectory to which the second event point belongs and the depth value of the second event point satisfies the following equation:

$$h = \frac{fM}{2L \times \tan\frac{\theta}{2}}$$

The depth mapping relationship represents the mapping relationship between the depth value of the second event point and the length of the event trajectory, where L is the length of the event trajectory to which the second event point belongs, θ is the FOV angle, f is the motion amplitude, M is the total number of pixel points, and h is the depth value of the second event point.

According to some embodiments, the length of the event trajectory to which each second event point belongs is input into the depth mapping relationship, and the depth value of each event point is output. The depth value represents the distance from the first plane to the second plane.

For example, when the length of the event trajectory to which a certain second event point belongs is 300 pixel points, the field of view angle is 60 degrees, the motion amplitude is three meters, and the total number of the pixel points in the background image along the predetermined motion direction is 1920, the depth value of the second event point is calculated as follows:

$$h = \frac{3 \times 1920}{2 \times 300 \times \tan\frac{60}{2}} = 16.6$$

Therefore, the distance between the event camera and the region represented by the second event point in the background image is 16.6 meters, i.e., the depth value of the second event point is 16.6.

Therefore, the depth value of each second event point in the background image can be calculated by the length of the event trajectory within one motion cycle and the depth mapping relationship, and the depth value can be used to represent the distance between the target object and the event camera. The calculation process of depth value of each event point is independent of each other, which reduces the computational load as analyzing the relationship between different images or different event points is no more needed.

At block S14, determining pixel value of the target pixel point based on the depth value of the second event point in the background image to generate a depth image of the target object.

According to some embodiments, the pixel value of the target pixel point can be determined based on the depth value of the second event point in the background image, and the depth image of the target object can be generated. The pixel value of all pixel points in the background image is null value, and both the background image and the depth image belong to digital images, therefore, after determining the pixel value of the target pixel points to generate the depth image, pixel value of all positions other than the target pixel point in the depth image is null value.

Since the values of all pixel points in the digital image are within a predetermined range, it is necessary to normalize all depth values to ensure that the pixel values of each pixel point in the depth image are within the predetermined range. The predetermined range can be represented as (min, max), for example, the predetermined range can be (0, 255).

According to some embodiments, determining pixel value of the target pixel point based on the depth value of the second event point in the background image includes: normalizing the depth values of all second event points in the background image to obtain a normalized depth value of each event point; setting the normalized depth value of the second event point as the pixel value of the target pixel point.

The normalization can use a maximization algorithm, a minimization algorithm, or other existing normalization algorithms, which is not limited in this application. For example, there are four second event points in the background image, and the depth values of the four second event points are 300, 450, 450, and 450, respectively, normalizing all depth values of the second event points by a maximization algorithm will result in normalized depth values of 0.66, 1, 1, and 1, respectively.

According to some embodiments, determining pixel value of the target pixel point based on the depth value of the second event point in the background image includes: normalizing the depth values of all second event points in the background image to obtain the normalized depth value of each event point; calculating a product of the normalized depth value of the second event point and an upper limit of the predetermined pixel value in the depth image, and setting the product as the pixel value of the target pixel point.

According to some embodiments, the normalization can use a maximization algorithm, a minimization algorithm, or other existing normalization algorithms, which is not limited in this application. The upper limit of the predetermined pixel value in the depth image refers to the maximum value in the predetermined range. For example, when the predetermined range is (0, 255), the pixel value upper limit is 255. For example, there are four second event points in the background image with depth values of 300, 450, 450, and 450, normalizing all depth values of the four second event points using a maximization algorithm will result in normalized depth values of 0.66, 1, 1, and 1, respectively. Furthermore, the product of the depth value of each second event point and the pixel value upper limit can be calculated, resulting in 168.3, 255, 255, and 255. Finally, the pixel values of the target pixel points corresponding to each second event point can be set as 168.3, 255, 255, and 255, respectively.

Therefore, after obtaining the target position information and the depth value of each event point, all event points can be placed in the same depth space according to the respective target position information and depth value, thereby generating the depth image of the imaging range.

It should be noted that one motion cycle is sufficient to obtain the depth value of the event point. The motion cycle of the event camera can be changed by adjusting the actuator, which flexibly adjusts generation speed of the depth image and increases frame rate of the depth image.

According to some embodiments, when the brightness variation within the imaging range is small due to insufficient lighting, no first event point will be generated during the motion of the event camera driven by the actuator. In order to ensure that at least one first event point within the imaging range can be captured, a projector can be used to project a matrix of light spots in the imaging range to generate at least one event point. The matrix of light spots can be infrared light or visible light, which is not limited here. The position and quantity of the matrix of light spots can be adjusted to capture event points in specific areas, thereby generating depth images of those specific areas.

Therefore, the depth image within the imaging range can be generated by driving the event camera by the actuator, and the generation speed of the depth image can be flexibly adjusted by adjusting the motion cycle.

Therefore, during the periodic motion of the event camera driven by the actuator, multiple event images are collected and the first event point in the event images can be marked by monitoring the brightness variation within the imaging range of the event camera in real-time. Then the first event points in multiple event images represent the changes in light intensity within the imaging range, and multiple second event points are marked in a predetermined background image based on the first event points. Therefore, the information of light intensity changes in multiple event images can be integrated in the same background image, ensuring the efficiency of generating subsequent depth images. The event trajectory is determined by multiple second event points in the predetermined background image, the depth value of each second event point is calculated based on the length of the event trajectory, and the pixel value of the target pixel point in the background image is determined based on the depth value to generate the depth image, which reduces the cost of generating depth images and improves the operational efficiency of generating depth images.

Figure 7:
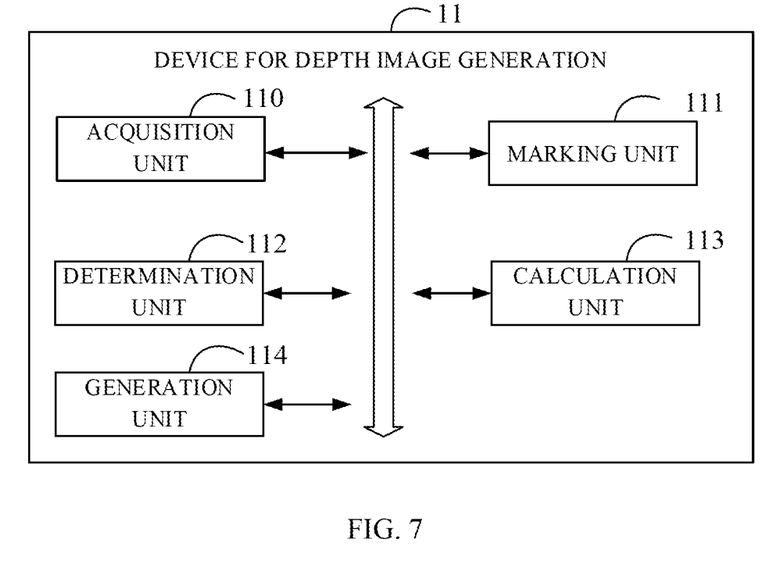
FIG. 7 is a functional module diagram of an embodiment of a device for generating depth image of the disclosure.

Referring to FIG. 7, a functional block diagram of an embodiment of a device for generating depth image 11 described in the present application is illustrated. The device for generating depth image 11 includes an acquisition unit 110, a marking unit 111, a determination unit 112, a calculation unit 113, and a generation unit 114. The term "module/unit" as referred to in this application denotes a series of computer-readable instruction segments that can be executed by a processor 13, capable of performing specific functions, and stored in the storage device 12. The functionalities of the various modules/units will be described in detail in subsequent embodiments.

The acquisition unit 110 acquires multiple event images of the target object captured by the event camera driven by the actuator during current motion cycle, each event image includes at least one first event point.

The marking unit 111 marks target pixel points in a pre-stored background image that have the same positional information as each first event point in the multiple event images to obtain multiple second event points in the background image.

The determination unit 112 determines at least one event trajectory in the background image based on each second event point.

The calculation unit 113 calculates the depth value of each second event point based on the motion range of the event camera during the motion cycle and the length of the event trajectory to which each second event point belongs.

The generation unit 114 determines pixel value of the target pixel point based on the depth value of the second event point in the background image to generate a depth image of the target object.

According to at least one embodiment, the acquisition unit 110 determines the first event point in the event image by monitoring the brightness increase of each pixel point within the imaging range of the event camera in real-time during the preset motion period, and when the brightness increase of any pixel point exceeds a preset first threshold, capturing the image information within the imaging range, acquiring the event image, and determining that pixel point as the first event point.

According to at least one embodiment, the acquisition unit 110 determines the first event point in the event image by monitoring the brightness decrease of each pixel point within the imaging range of the event camera in real-time during the preset motion period, and when the brightness decrease of any pixel point exceeds a preset second threshold, capturing the image information within the imaging range, acquiring the event image, and determining that pixel point as the first event point.

According to some embodiments, when the event camera performs translational motion, the motion range is the maximum translation distance of the event camera during the motion cycle. The calculation unit 113 calculates the depth value of the second event point based on the motion range of the event camera during the motion cycle and the length of the event trajectory to which the second event point belongs includes: obtaining the field of view (FOV) angle of the event camera along the predetermined motion direction and the total number of pixel points occupied by the axis projection in the background image when the axis is projected onto the background image in the predetermined motion direction; establishing a depth mapping relationship between the length of an event trajectory to which the second event point belongs and the depth value of the second event point is constructed. The depth mapping relationship satisfies the following formula:

$$h = \frac{fM}{2L \times \tan\frac{\theta}{2}}$$

where L is the length of the event trajectory to which the second event point belongs, θ is the FOV angle, f is the motion range, M is the total number of pixel points, and h is the depth value of the second event point.

According to some embodiments, the generation unit 114 determines pixel value of the target pixel point based on the depth value of the second event point in the background image includes: normalizing the depth values of all second event points in the background image to obtain a normalized depth value of each event point; setting the normalized depth value of the second event point as the pixel value of the target pixel point.

According to some embodiments, the generation unit 114 determines pixel value of the target pixel point based on the depth value of the second event point in the background image includes: normalizing the depth values of all second event points in the background image to obtain the normalized depth value of each event point; calculating a product of the normalized depth value of the second event point and an upper limit of the predetermined pixel value in the depth image, and setting the product as the pixel value of the target pixel point.

Figure 8:
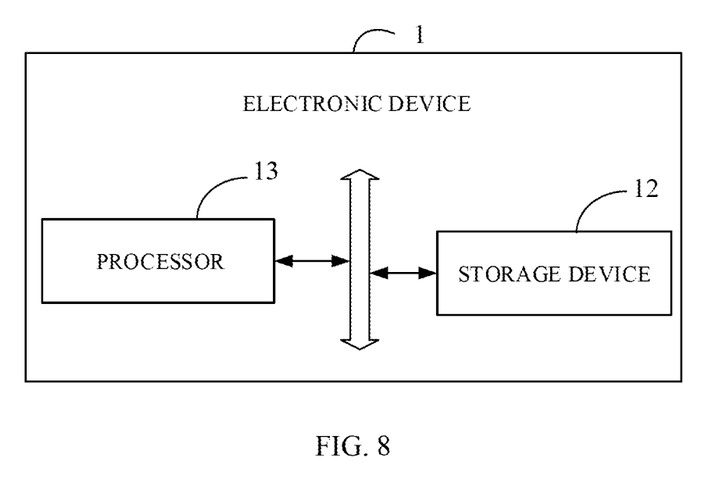
FIG. 8 is a structural schematic diagram of an embodiment of an electronic device for generating depth image of the disclosure.

Referring to FIG. 8, a schematic diagram of the electronic device 1 according to an embodiment of the disclosure is illustrated. The electronic device 1 includes a storage device 12 and a processor 13. The storage device 12 is used to store computer-readable instructions, and the processor 13 is used to execute the computer-readable instructions stored in the storage device 12 to implement the method for generating depth image described in any of the embodiments mentioned above.

According to at least one embodiment, the electronic device 1 further includes a bus and a computer program stored in the storage device 12 that can run on the processor 13, such as a generating depth image program.

FIG. 8 only illustrates the electronic device 1 with the storage device 12 and the processor 13. It should be understood by those skilled in the art that the structure shown in FIG. 8 does not limit the electronic device 1 and may include fewer or more components, or a combination of certain components, or a different arrangement of components.

Referring to FIG. 1 and FIG. 8, the storage device 12 in the electronic device 1 stores multiple computer-readable instructions to implement a method for generating depth image, and the processor 13 can execute these multiple instructions to achieve the following: acquiring multiple event images of the target object captured by the event camera driven by the actuator during current motion cycle, each event image includes at least one first event point; marking target pixel points in a pre-stored background image that have the same positional information as each first event point in the multiple event images to obtain multiple second event points in the background image; determining at least one event trajectory in the background image based on each second event point; calculating the depth value of each second event point based on the motion range of the event camera during the motion cycle and the length of the event trajectory to which each second event point belongs; determining pixel value of the target pixel point based on the depth value of the second event point in the background image to generate a depth image of the target object.

Specifically, the processor 13 can refer to the description of the corresponding steps in the embodiment shown in FIG. 1 for the specific implementation of the above instructions, which will not be repeated here.

It will be understood by those skilled in the art that the schematic diagram is merely an example of the electronic device 1 and does not limit the electronic device 1. The electronic device 1 can have a bus-type structure or a star-type structure. The electronic device 1 may also include other hardware or software components, more or fewer than those shown in the diagram, or a different arrangement of components. For example, the electronic device 1 may include input/output devices, network access devices, and so on.

It should be noted that the electronic device 1 is just an example, and other existing or future electronic products that are adaptable to the present application should also be included within the scope of protection of the present application and incorporated herein by reference.

The storage device 12 includes at least one type of readable storage medium, which can be non-volatile or volatile. The readable storage medium includes flash memory, hard disk, multimedia card, card-type storage (such as SD or DX memory), magnetic storage, disk, optical disc, and so on. In some embodiments, the storage device 12 can be an internal storage unit of the electronic device 1, such as the mobile hard disk of the electronic device 1. In other embodiments, the storage device 12 can also be an external storage device of the electronic device 1, such as a plug-in mobile hard disk, smart media card (SMC), secure digital (SD) card, flash card, etc., equipped on the electronic device 1. The storage device 12 can be used not only to store application software and various types of data installed in the electronic device 1, such as the code of the vehicle blind area target detection program, but also to temporarily store data that has been output or will be output.

The processor 13 can be composed of integrated circuits. For example, it can be composed of a single packaged integrated circuit or multiple integrated circuits with the same or different functions, including one or more central processing units (CPUs), microprocessors, digital processing chips, graphics processors, and various combinations of control chips. The processor 13 is the control unit of the electronic device 1, connecting various components of the electronic device 1 through various interfaces and lines. It runs or executes programs or modules (such as the vehicle blind area target detection program) stored in the storage device 12 and calls data stored in the storage device 12 to perform various functions of the electronic device 1 and process data.

The processor 13 executes the operating system and various installed applications of the electronic device 1. It executes the disclosures to implement the steps of various target detection method for blind areas of a vehicle embodiments mentioned above, such as the steps shown in FIG. 3.

The computer program can be divided into one or more modules/units, which are stored in the storage device 12 and executed by the processor 13 to complete the present application. The one or more modules/units may be a series of computer-readable instruction segments capable of performing specific functions, and the instruction segments are used to describe the process of acquisition the computer program in the electronic device 1. For example, the computer program can be divided into acquisition unit 110, stitching unit 111, detection unit 112, calculation unit 113, and filtering unit 114.

The integrated units implemented in the form of software functional modules can be stored in a computer-readable storage medium. The software function modules stored in a storage medium include several instructions to enable a computer device (such as a personal computer, computing device, or network device) or a processor to execute parts of the target detection method for blind areas of a vehicle described in various embodiments of the present application.

If the modules/units integrated in the electronic device 1 are implemented in the form of software functional units and sold or used as independent products, they may be stored in a computer-readable storage medium. Based on this understanding, the disclosure can implement all or part of the processes in the methods of the above embodiments and can also be completed by instructing the relevant hardware through a computer program. The computer program can be stored in a computer-readable storage medium, and when the computer program is acquired by the processor, the blocks of the foregoing method embodiments can be implemented.

Wherein, the computer program includes computer program code, and the computer program code may be in the form of source code, target object code, obtainable file or some intermediate form, and the like. The computer-readable medium may include: any entity or device capable of carrying the computer program code, recording medium, U disk, removable hard disk, magnetic disk, optical disk, computer memory, read-only memory (ROM).

Furthermore, the computer-readable storage medium mainly includes a program storage area and a data storage area. The program storage area can store an operating system, at least one application required for a specific function, and so on. The data storage area can store data created based on the use of blockchain nodes.

The bus can be a Peripheral Component Interconnect (PCI) bus, an Extended Industry Standard Architecture (EISA) bus, or bus of other interconnection standards. The bus can be divided into address bus, data bus, control bus, etc. For ease of representation, only one arrow is shown in FIG. 8, but it does not mean that there is only one bus or one type of bus. The bus is configured to establish communication connections between the storage device 12, at least one processor 13, and other components.

In addition, the embodiments of the present application also provide a computer-readable storage medium (not shown in the FIG.) that stores computer-readable instructions. The computer-readable instructions are executed by the processor in the electronic device to implement the target detection method for blind areas of a vehicle described in any of the embodiments mentioned above.

In several embodiments provided in the present application, it should be understood that the disclosed systems, devices, and methods can be implemented in other ways. For example, the described device embodiments are only illustrative, and the division of modules is for logical functional division. In actual implementation, there may be different division methods.

In addition, each functional unit in each embodiment of the disclosure can be integrated into one processing unit, or can be physically present separately in each unit, or two or more units can be integrated into one unit. The above integrated unit can be implemented in a form of hardware or in a form of a software functional unit.

While the invention has been described in detail in connection with only a limited number of embodiments, it should be readily understood for the skilled in the art that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for generating a depth image, comprising:
   acquiring multiple event images of a target object captured by an event camera driven by an actuator during a motion cycle, each event image is provided with at least one first event point;
   marking multiple target pixel points in a background image that have same positional information as each of the at least one first event point in the multiple event images, to obtain multiple second event points in the background image, the background image is pre-stored;
   determining at least one event trajectory in the background image based on each of the multiple second event points;
   calculating a depth value of each of the multiple second event points based on a motion range of the event camera during the motion cycle and a length of the at least one event trajectory to which each the second event point belongs; and
   determining a pixel value of each of the multiple target pixel points based on the depth value of each of the multiple second event points in the background image, to generate a depth image of the target object.

2. The method of claim 1, wherein when the event camera performs translational motion, the motion range is a maximum translation distance of the event camera during the motion cycle.

3. The method of claim 2, wherein calculating the depth value of each of the multiple second event points comprises:
   obtaining a field of view (FOV) angle of the event camera along a predetermined motion direction and obtaining total number of pixel points occupied by a projection of an axis indicating the predetermined motion direction in the background image, when the axis is projected onto the background image,
   establishing a depth mapping relationship between a length of each of the at least one event trajectory to which one of the multiple second event points belongs and the depth value of the one second event point based on the FOV angle, the total number of pixel points, and the motion range, the depth mapping relationship satisfies a formula as follows:

$$h = \frac{fM}{2L \times \tan\frac{\theta}{2}}$$

where L is the length of each of the at least one event trajectory to which one of the multiple second event point belongs, θ is the FOV angle, f is the motion range, M is the total number of pixel points, and h is the depth value of the second event point.

4. The method of claim 1, wherein determining the pixel value of each of the multiple target pixel points based on the depth value of each of the multiple second event points in the background image comprises:
   normalizing the depth values of each of the multiple second event points in the background image to obtain a normalized depth value of each of the multiple second event points, and
   setting the normalized depth value of each of the multiple second event point as the pixel value of the target pixel point.

5. The method of claim 1, wherein determining the pixel value of each of the multiple target pixel points based on the depth value of each of the multiple second event points in the background image comprises:
   normalizing the depth values of each of the multiple second event points in the background image to obtain a normalized depth value of each of the multiple second event points, and
   calculating a product of the normalized depth value of each of the multiple second event points and an upper limit of a predetermined pixel value in the depth image, and setting the product as the pixel value of the target pixel point.

6. The method of claim 1, wherein determining the at least one first event point in each of the multiple event images comprises:
   monitoring a brightness increase of each pixel point within the imaging range of the event camera in real-time during a preset motion period, and
   when the brightness increase of one pixel point exceeds a preset first threshold, capturing image information within the imaging range, acquiring the event image, and determining the one pixel point as one of the at least one first event point.

7. The method of claim 1, wherein determining the at least one first event point in each of the multiple event images comprises:
   monitoring a brightness decrease of each pixel point within the imaging range of the event camera in real-time during a preset motion period; and
   when the brightness decrease of one pixel point exceeds a preset second threshold, capturing image information within the imaging range, acquiring the event image, and determining the one pixel point as one of the at least one first event point.

8. A device for generating a depth image, comprising:
   an acquisition unit that acquires multiple event images of a target object captured by an event camera driven by an actuator during a motion cycle, each event image is provided with at least one first event point;
   a marking unit that marks multiple target pixel points in a background image that have same positional information as each of the at least one first event point in the multiple event images, to obtain multiple second event points in the background image, the background image being pre-stored;
   a determination unit that determines at least one event trajectory in the background image based on each of the multiple second event points;
   a calculation unit that calculates a depth value of each of the multiple second event points based on a motion range of the event camera during the motion cycle and length of the at least one event trajectory to which the second event point belongs; and
   a generation unit that determines a pixel value of each of the multiple target pixel points based on the depth value of each of the multiple second event points in the background image to generate a depth image of the target object.

9. An electronic device comprising:
   at least one processor; and
   a storage device coupled to the at least one processor and storing computer-readable instructions for execution by the at least one processor to cause the at least one processor to implement following processes:

acquiring multiple event images of a target object captured by an event camera driven by an actuator during a motion cycle, each event image is provided with at least one first event point;

marking multiple target pixel points in a background image that have same positional information as each of the at least one first event point in the multiple event images, to obtain multiple second event points in the background image, the background image being pre-stored;

determining at least one event trajectory in the background image based on each of the multiple second event points;

calculating a depth value of each of the multiple second event points based on a motion range of the event camera during the motion cycle and a length of the at least one event trajectory to which each the second event point belongs; and determining a pixel value of each of the multiple target pixel points based on the depth value of each of the multiple second event points in the background image, to generate a depth image of the target object.

10. The electronic device of claim 9, wherein when the event camera performs translational motion, the motion range is a maximum translation distance of the event camera during the motion cycle.

11. The electronic device of claim 10, wherein the at least one processor calculates the depth value of each of the multiple second event points by:

obtaining a field of view (FOV) angle of the event camera along a predetermined motion direction and obtaining total number of pixel points occupied by a projection of an axis indicating the predetermined motion direction in the background image when the axis is projected onto the background image, establishing a depth mapping relationship between a length of each of the at least one event trajectory to which one of the multiple second event points belongs and the depth value of the one second event point based on the FOV angle, the total number of pixel points, and the motion range, the depth mapping relationship satisfies a formula as follows:

$$h = \frac{fM}{2L \times \tan\frac{\theta}{2}}$$

where L is the length of each of the at least one event trajectory to which one of the multiple second event point belongs, θ is the FOV angle, f is the motion range, M is the total number of pixel points, and h is the depth value of the second event point.

12. The electronic device of claim 9, wherein the at least one processor determines the pixel value of each of the multiple target pixel points based on the depth value of each of the multiple second event points in the background image by:

normalizing the depth values of each of the multiple second event points in the background image to obtain a normalized depth value of each of the multiple second event points, and setting the normalized depth value of each of the multiple second event point as the pixel value of the target pixel point.

13. The electronic device of claim 9, wherein the at least one processor determines the pixel value of each of the multiple target pixel points based on the depth value of each of the multiple second event points in the background image comprises:

normalizing the depth values of each of the multiple second event points in the background image to obtain a normalized depth value of each of the multiple second event points, and calculating a product of the normalized depth value of each of the multiple second event points and an upper limit of a predetermined pixel value in the depth image, and setting the product as the pixel value of the target pixel point.

14. The electronic device of claim 9, wherein the at least one processor determines the at least one first event point in each of the multiple event images by:

monitoring a brightness increase of each pixel point within the imaging range of the event camera in real-time during a preset motion period, and when the brightness increase of one pixel point exceeds a preset first threshold, capturing image information within the imaging range, acquiring the event image, and determining the one pixel point as one of the at least one first event point.

15. The electronic device of claim 9, wherein the at least one processor determines the at least one first event point in each of the multiple event images comprises:

monitoring a brightness decrease of each pixel point within the imaging range of the event camera in real-time during a preset motion period, and when the brightness decrease of one pixel point exceeds a preset second threshold, capturing image information within the imaging range, acquiring the event image, and determining the one pixel point as one of the at least one first event point.

* * * * *